United States Patent
Kishi et al.

(10) Patent No.: US 10,559,820 B2
(45) Date of Patent: Feb. 11, 2020

(54) NONAQUEOUS ELECTROLYTE BATTERY, BATTERY PACK AND VEHICLE

(71) Applicant: Kabushiki Kaisha Toshiba, Minato-ku (JP)

(72) Inventors: Takashi Kishi, Yokosuka (JP); Kazuomi Yoshima, Yokohama (JP); Wen Zhang, Sagamihara (JP); Yasuhiro Harada, Isehara (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 126 days.

(21) Appl. No.: 15/455,160

(22) Filed: Mar. 10, 2017

(65) Prior Publication Data

US 2017/0271666 A1    Sep. 21, 2017

(30) Foreign Application Priority Data

Mar. 15, 2016 (JP) ................. 2016-051533

(51) Int. Cl.
*H01M 4/485* (2010.01)
*H01M 2/16* (2006.01)
(Continued)

(52) U.S. Cl.
CPC ........... *H01M 4/485* (2013.01); *H01M 2/166* (2013.01); *H01M 2/1646* (2013.01);
(Continued)

(58) Field of Classification Search
CPC ........ H01M 4/485; H01M 2/16; H01M 2/166; H01M 2/1686; H01M 10/0565; H01M 10/42; H01M 10/10425
See application file for complete search history.

(56) References Cited

U.S. PATENT DOCUMENTS

2007/0231693 A1   10/2007  Inagaki et al.
2011/0274965 A1   11/2011  Yamada et al.
(Continued)

FOREIGN PATENT DOCUMENTS

JP     2010-244658 A    10/2010
JP     4557920 B2        10/2010
(Continued)

OTHER PUBLICATIONS

Extended European Search Report dated Jun. 8, 2017 in Patent Application No. 17159337.9.

*Primary Examiner* — Karie O'Neill Apicella
(74) *Attorney, Agent, or Firm* — Oblon, McClelland, Maier & Neustadt, L.L.P.

(57) ABSTRACT

According to one embodiment, a nonaqueous electrolyte battery is provided. The nonaqueous electrolyte battery includes a positive electrode, a negative electrode including a negative electrode active material layer, a separator layer, an intermediate region, and a gel nonaqueous electrolyte. The separator layer and the intermediate region hold at least a part of the gel nonaqueous electrolyte. The nonaqueous electrolyte battery satisfies a volume ratio $V_A/V_B$ of 5 or more. $V_A$ is a volume of the intermediate region. $V_B$ is an average volume of gaps among the particles of the niobium-and-titanium-containing composite oxide in the negative electrode active material layer.

16 Claims, 4 Drawing Sheets

(51) Int. Cl.
*H01M 10/0565* (2010.01)
*H01M 10/42* (2006.01)
*H01M 4/131* (2010.01)
*H01M 4/36* (2006.01)
*H01M 4/62* (2006.01)
*H01M 10/0525* (2010.01)
*H01M 4/02* (2006.01)
*H01M 4/1391* (2010.01)
*H01M 10/04* (2006.01)
*H01M 10/0587* (2010.01)

(52) U.S. Cl.
CPC ....... *H01M 2/1673* (2013.01); *H01M 2/1686* (2013.01); *H01M 4/131* (2013.01); *H01M 4/366* (2013.01); *H01M 4/625* (2013.01); *H01M 10/0525* (2013.01); *H01M 10/0565* (2013.01); *H01M 10/425* (2013.01); *H01M 4/1391* (2013.01); *H01M 10/0431* (2013.01); *H01M 10/0587* (2013.01); *H01M 10/4235* (2013.01); *H01M 2004/021* (2013.01); *H01M 2004/027* (2013.01); *H01M 2200/20* (2013.01); *H01M 2220/20* (2013.01); *H01M 2300/0085* (2013.01); *Y02E 60/122* (2013.01); *Y02T 10/7011* (2013.01)

(56) References Cited

U.S. PATENT DOCUMENTS

| | | |
|---|---|---|
| 2012/0107692 A1 | 5/2012 | Harada et al. |
| 2012/0171550 A1 | 7/2012 | Inagaki et al. |
| 2012/0251869 A1 | 10/2012 | Lee et al. |
| 2014/0193691 A1 | 7/2014 | Ueki et al. |
| 2014/0370351 A1 | 12/2014 | Kwon et al. |
| 2014/0377611 A1 | 12/2014 | Kwon et al. |
| 2015/0010820 A1* | 1/2015 | Takami .................. H01M 4/366 429/221 |
| 2015/0044576 A1* | 2/2015 | Eisele .................. C01G 33/006 429/322 |
| 2015/0333321 A1 | 11/2015 | Naito et al. |
| 2016/0036048 A1 | 2/2016 | Naito et al. |
| 2016/0190581 A1 | 6/2016 | Sasakawa et al. |

FOREIGN PATENT DOCUMENTS

| | | |
|---|---|---|
| JP | 2012-99287 A | 5/2012 |
| JP | 5017493 B2 | 9/2012 |
| JP | 2013-543634 A | 12/2013 |
| JP | 2015-518643 A | 7/2015 |
| JP | 2015-518644 A | 7/2015 |
| KR | 10-2014-0012157 A | 1/2014 |
| KR | 101401792 | 5/2014 |
| KR | 10-2014-0084519 A | 7/2014 |
| KR | 10-2014-0095980 A | 8/2014 |
| KR | 10-2015-0130217 A | 11/2015 |
| WO | WO 2011/010371 A1 | 1/2011 |
| WO | WO 2015/040679 A1 | 3/2015 |
| WO | WO 2017/046915 A1 | 3/2017 |

* cited by examiner

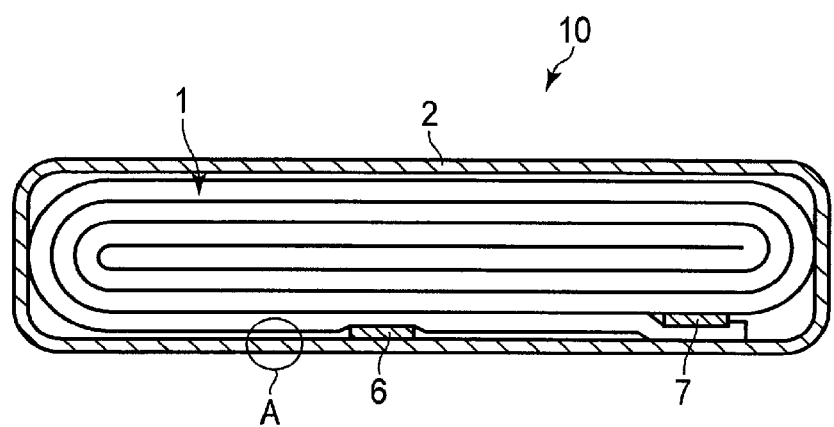
F I G. 1
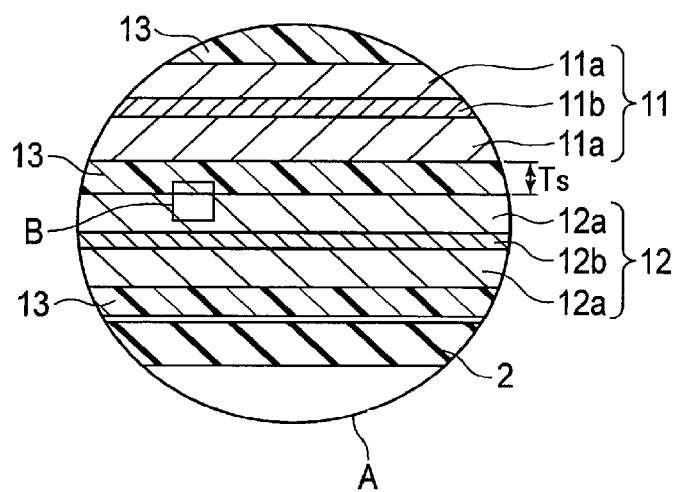
F I G. 2

NONAQUEOUS ELECTROLYTE BATTERY, BATTERY PACK AND VEHICLE

CROSS-REFERENCE TO RELATED APPLICATIONS

This application is based upon and claims the benefit of priority from the Japanese Patent Application No. 2016-051533, filed Mar. 15, 2016, the entire contents of which are incorporated herein by reference.

FIELD

Embodiments described herein relate generally to a nonaqueous electrolyte battery, a battery pack, and a vehicle.

BACKGROUND

Since a secondary battery can be repeatedly charged and discharged, the secondary batteries are useful for a reduction in waste, and is widely used for portable devices which cannot be connected to an AC power supply, or a as backup power supply when the AC power supply is disconnected or stopped. In recent years, the enlargement of a use range such as an on-vehicle application, backup for a solar cell and the like, or a power smoothing application has been considered for the secondary batteries. Because of this, an improvement in performance such as a capacity, temperature characteristics, or safety has been increasingly required for the secondary batteries.

A nonaqueous electrolyte secondary battery as an example of the secondary battery is a secondary battery which is charged and discharged by, for example, the transfer of lithium ions between positive and negative electrodes. Since the nonaqueous electrolyte battery uses an organic solvent in an electrolyte solution, it can provide a larger voltage than that provided by a battery using an aqueous solution such as a nickel-cadmium secondary battery and a nickel metal hydride secondary battery. In nonaqueous electrolyte secondary batteries which are practically used now, lithium-containing cobalt composite oxides, lithium-containing nickel composite oxides and the like are used as a positive electrode active material, for example. Carbon-based materials and oxides containing titanium (that is, titanium-containing oxides) and the like are used as a negative electrode active material. As an electrolyte solution, those obtained by dissolving a lithium salt such as $LiPF_6$ or $LiBF_4$ in an organic solvent such as cyclic carbonate or chain carbonate are used. The positive electrode containing the positive electrode active material exemplified above has an average operating potential of about 3.4 to 3.8 V (vs. $Li/Li^+$), and the maximum potential during charging of 4.1 to 4.3 V (vs. $Li/Li^+$), for example. The carbon-based material as the negative electrode active material has an average operating potential of about 0.05 to 0.5 V (vs. $Li/Li^+$). On the other hand, lithium titanate ($Li_4Ti_5O_{12}$) which is most typical in the titanium-containing oxide has an average operating potential of 1.55 V (vs. $Li/Li^+$). In the nonaqueous electrolyte secondary battery produced by combining the positive electrode containing the positive electrode active material shown above and the negative electrode containing lithium titanate, the battery voltage becomes 2.2 to 3.8 V, and the maximum charge voltage becomes 2.7 to 4.3 V.

Since the secondary battery using the titanium-containing oxide for the negative electrode can improve a charge-and-discharge cycle life, output performance, and safety, the secondary battery is put to practical use. However, it is required for the secondary battery used for on-vehicle and generation-related stationary applications to largely outperform the conventional portable device applications in terms of some performance. Particularly, a life of 10 years or more, large-current discharge performance of 5 C or 10 C and the like are required for the secondary batteries used in these applications.

Various titanium-containing oxides have been proposed. Spinel lithium titanate ($Li_4Ti_5O_{12}$, abbreviated to LTO) has been most reported, and has been already used as a commercially-available product. Other examples of the titanium-containing oxide include monoclinic titanium dioxide ($TiO_2$, abbreviated to $TiO_2$ (B)), niobium titanium-containing composite oxide (for example, monoclinic $Nb_2TiO_7$, and orthorhombic niobium titanium-containing composite oxide). These can achieve a larger capacity than that of the spinel lithium titanate. However, these oxides disadvantageously cause deterioration in a capacity over charge-and-discharge cycles as compared with the spinel lithium titanate.

BRIEF DESCRIPTION OF THE DRAWINGS

FIG. 1 is a schematic cross-sectional view of an example of a nonaqueous electrolyte battery according to a first embodiment;

FIG. 2 is an enlarged cross-sectional view of an A portion in FIG. 1;

DETAILED DESCRIPTION

Figure 3:
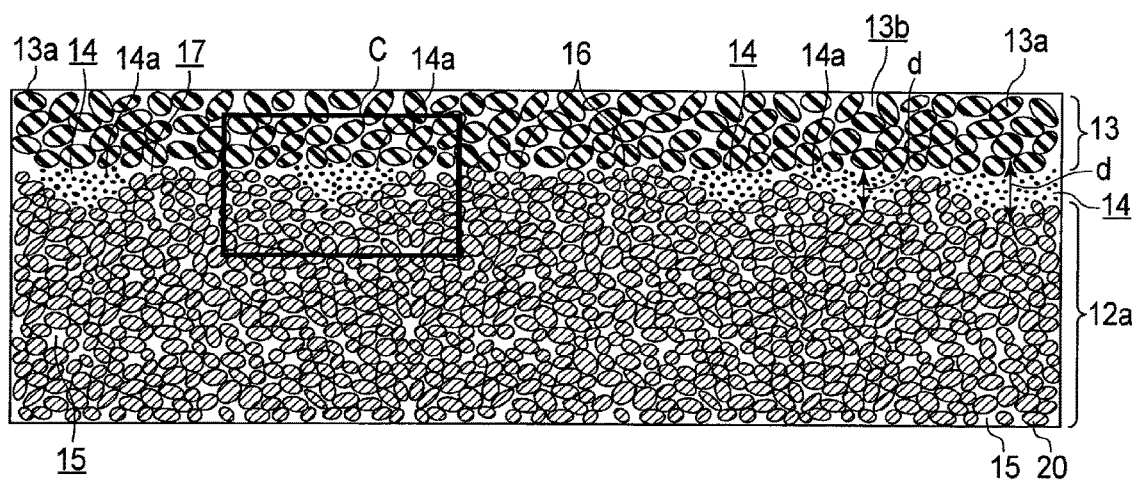
FIG. 3 is an enlarged cross-sectional view of a B portion in FIG. 2.

In general, according to one embodiment, there is provided a nonaqueous electrolyte battery. The nonaqueous electrolyte battery includes a positive electrode, a negative electrode, a separator layer, an intermediate region, and a gel nonaqueous electrolyte. The negative electrode includes a negative electrode active material layer. The negative electrode active material layer includes particles of a niobium-and-titanium-containing composite oxide. The separator layer is provided between the positive electrode and the negative electrode. The separator layer includes insulating particles. The intermediate region is provided between the negative electrode active material layer and the separator layer. The intermediate region includes a carbonaceous material. At least a part of the gel nonaqueous electrolyte is held in the separator layer and the intermediate region. The nonaqueous electrolyte battery satisfies a volume ratio $V_A/V_B$ of 5 or more. $V_A$ is a volume of the intermediate region. $V_B$ is an average volume of gaps among the particles of the niobium-and-titanium-containing composite oxide in the negative electrode active material layer.

According to the embodiment, there is provided a battery pack. The battery pack includes the nonaqueous electrolyte battery according to the embodiment.

According to the embodiment, there is provided a vehicle. The vehicle includes the battery pack according to the embodiment.

The embodiments will be explained below with reference to the drawings. In this case, the structures common to all embodiments are represented by the same symbols and duplicated explanations will be omitted. Also, each drawing is a typical view for explaining the embodiments and for promoting an understanding of the embodiments. Though there are parts different from an actual device in shape, dimension and ratio, these structural designs may be properly changed taking the following explanations and known technologies into consideration.

First Embodiment

According to a first embodiment, there is provided a nonaqueous electrolyte battery. The nonaqueous electrolyte battery includes a positive electrode, a negative electrode, a separator layer, an intermediate region, and a gel nonaqueous electrolyte. The negative electrode includes a negative electrode active material layer. The negative electrode active material layer includes particles of a niobium-and-titanium-containing composite oxide. The separator layer is provided between the positive electrode and the negative electrode. The separator layer includes insulating particles. The intermediate region is provided between the negative electrode active material layer and the separator layer. The intermediate region includes a carbonaceous material. At least a part of the gel nonaqueous electrolyte is held in the separator layer and the intermediate region. The nonaqueous electrolyte battery satisfies a volume ratio $V_A/V_B$ of 5 or more. $V_A$ is a volume of the intermediate region. $V_B$ is an average volume of gaps among the particles of the niobium-and-titanium-containing composite oxide in the negative electrode active material layer.

As a result of the extensive studies, the present inventors have found that poor charge-and-discharge cycle performance exhibited by niobium-and-titanium-containing composite oxides is attributable to a large volume change in the niobium-and-titanium-containing composite oxides due to charge and discharge. The present inventors' findings are as follows.

The niobium-and-titanium-containing composite oxide causes a volume change accompanying charge and discharge. This volume change is generally greater than that of lithium-containing oxide which can be used for a positive electrode such as nickel-containing lithium oxide or cobalt-containing lithium oxide.

In an electrode which includes niobium-and-titanium-containing composite oxide causing a volume change due to charge and discharge, the disconnection of an electronically conductive path electrically connecting an active material to a current collector is apt to be caused by the volume change in the niobium-and-titanium-containing composite oxide. The disconnection of the electronically conductive path causes an increase in the internal resistance of the electrode. The niobium-and-titanium-containing composite oxide itself has low electronic conductivity. Therefore, particles of niobium-and-titanium-containing composite oxide which completely lose the electronically conductive path do not contribute to a charge-and-discharge reaction, which leads to a decrease in a capacity. Similarly, in a carbon-based negative electrode active material including graphite causing a large volume change, carbon itself as an active material has good electronic conductivity, which does not cause problems such as the disconnection and loss of the electronically conductive path.

Particularly, in a battery using a gel nonaqueous electrolyte or a solid electrolyte, the fracture of an ion conductive path, which assumes the traffic of ions between a positive electrode active material and a negative electrode active material, is also apt to be caused by the volume change. In the battery using the solid electrolyte, ion conductivity at the interface between the niobium-and-titanium-containing composite oxide and the solid electrolyte is decreased by the volume change. Therefore, in these batteries, the electronically conductive path is impaired, which causes deterioration in a capacity.

The volume change in the niobium-and-titanium-containing composite oxide disadvantageously also increases the possibility of a short circuit caused by direct contact between a positive electrode and a negative electrode. The short circuit may cause not only deterioration in a capacity but also generation of heat and ignition and the like.

As a result of these, the nonaqueous electrolyte battery which includes the electrode including the niobium-and-titanium-containing composite oxide causing the volume change due to charge and discharge causes deterioration in a capacity when the charge-and-discharge cycles are repeated, if measures are not taken.

By contrast, the nonaqueous electrolyte battery according to the first embodiment can exhibit excellent charge-and-discharge cycle performance, as described later.

The nonaqueous electrolyte battery according to the first embodiment includes an intermediate region which is adjacent to a negative electrode active material layer and to a separator layer. That is, this intermediate region is provided between the negative electrode active material layer and the separator layer. This intermediate region includes a carbonaceous material, and holds a gel nonaqueous electrolyte. In other words, the intermediate region is impregnated with the gel nonaqueous electrolyte. Such an intermediate region can receive the volume change in the niobium-and-titanium-containing composite oxide due to charge-and-discharge cycles to effectively prevent the disconnection of the ion conductive path, and can suppress the deformation of the negative electrode active material layer to a minimum in a plane direction which is parallel to a metal foil as a current collector.

Furthermore, since the carbonaceous material included in the intermediate region aids the preservation of electronic conductivity at the interface between the negative electrode active material layer and the intermediate region, the carbonaceous material can also suppress the disconnection of the electronically conductive path.

The separator layer including insulating particles can prevent direct contact between a positive electrode and a negative electrode.

As these results, the nonaqueous electrolyte battery according to the first embodiment can suppress, in charge-and-discharge cycles, an increase in resistance and a decrease in a capacity, which can provide life extension. That is, the nonaqueous electrolyte battery according to the first embodiment can exhibit excellent cycle life performance.

When a volume ratio $V_A/V_B$ is less than 5, the intermediate region cannot sufficiently receive the volume change in the niobium-and-titanium-containing composite oxide accompanying charge-and-discharge cycles. The gaps among the particles of the niobium-and-titanium-containing composite oxide in the negative electrode active material layer may have variation in a size, and therefore, may also have variation in a volume. Thereby, a volume $V_A$ of the intermediate region is 5 times or more an average value $V_B$ of the volumes of the gaps among the particles of the niobium-and-titanium-containing composite oxide in the negative electrode active material layer.

When the filling properties of the niobium-and-titanium-containing composite oxide in the negative electrode active material layer are increased, the volume change which should be received is also increased, and thereby the volume ratio $V_A/V_B$ is more preferably 10 or more. On the other hand, from the viewpoint of a capacity, the volume ratio $V_A/V_B$ is preferably 100 or less, and more preferably 50 or less.

The surface of the negative electrode active material layer facing the separator may include a recessed part. That is, the negative electrode active material may include a recessed part which faces the separator layer. The intermediate region is preferably provided in the recessed part. The recessed part may be a hollow or a groove, for example. The intermediate region is preferably adjacent to the recessed part in the surface of the negative electrode active material layer. The intermediate region which is adjacent to the recessed part of the surface of the negative electrode active material layer can reduce the volume fluctuation of the niobium-and-titanium-containing composite oxide in not only the thickness direction of the negative electrode active material layer but also the plane direction thereof, and can further suppress the decrease in the capacity.

A depth d of the recessed part in the surface of the negative electrode active material layer is preferably within a range of 5% to 30% of a thickness $T_s$ of the separator layer, more preferably within a range of 5% to 20%, and yet more preferably within a range of 8% to 12%. The depth d of the recessed part is the maximum depth of the negative electrode active material layer in the thickness direction.

Alternatively, the surface of the separator layer in contact with the negative electrode active material layer may include a recessed part, or each of the surface of the negative electrode active material layer and the surface of the separator layer may include a recessed part.

A part of the separator layer is preferably in contact with the surface of the negative electrode active material layer. Contact points between the separator layer and the surface of the negative electrode active material layer can make lithium ions pass through the contact points without making the lithium ions pass through the intermediate region containing the gel nonaqueous electrolyte and the carbonaceous material. Therefore, the nonaqueous electrolyte battery according to this preferable aspect can exhibit more excellent output performance.

In this preferable aspect, a volume ratio $V_A/V_C$ is preferably 5 or more, and more preferably 10 or more. Herein, $V_A$ is the volume of the intermediate region, and $V_C$ is the average volume of the gaps among the particles of the niobium-and-titanium-containing composite oxide and the insulating particles in portions with each of which the negative electrode active material layer and the separator layer are in contact.

A weight percentage $W_c/(W_c+W_g)$ of the carbonaceous material in the intermediate region is preferably from 0.5% by weight to 10% by weight. Herein, $W_c$ is the weight of the carbonaceous material included in the intermediate region, and $W_g$ is the weight of the gel nonaqueous electrolyte which is held in the intermediate region. In the intermediate region in which the weight percentage of the carbonaceous material is within the range, the obstacle of the carbonaceous material having poor ion conductivity to the transfer of the lithium ions can be prevented. In the intermediate region in which the weight percentage of the carbonaceous material is within the range, an electronically conductive path auxiliary effect can be sufficiently obtained.

Furthermore, when being particularly subjected to a high-temperature environment of 45° C. or higher, the volume change in constitutional members due to such an environmental temperature may be added. Accordingly, the weight percentage $W_c/(W_c+W_g)$ of the carbonaceous material in the intermediate region is more preferably 2% by weight or more. Also, when the carbonaceous material particularly includes a scale-like graphite-based carbonaceous material, the scale-like graphite-based carbonaceous material may be in parallel with the surface of an electrode to hinder the ion conductivity, and thereby the weight percentage $W_c/(W_c+W_g)$ of the carbonaceous material in the intermediate region is more desirably 5% by weight or less.

Next, a nonaqueous electrolyte battery according to a first embodiment will be described in more detail.

The nonaqueous electrolyte battery according to the first embodiment includes a positive electrode, a negative electrode, a separator layer, and a gel nonaqueous electrolyte.

The positive electrode can include, for example, a positive electrode current collector and a positive electrode active material layer which is formed on one surface or both surfaces of the positive electrode current collector. The positive electrode active material layer can be in contact with the positive electrode current collector.

The positive electrode current collector can include a part a surface of which the positive electrode active material layer is not formed on. The part can serve as a positive electrode tab. Alternatively, the positive electrode can include a positive electrode tab which is not a part of the positive electrode current collector.

The positive electrode active material layer can include a positive electrode active material, a conductive agent and a binder.

The negative electrode includes a negative electrode active material layer. The negative electrode can further include a negative electrode current collector. The negative electrode active material layer may be formed, for example, on one surface or both surfaces of the negative electrode current collector.

The negative electrode current collector can include a part a surface of which the negative electrode active material layer is not formed on. The part can serve as a negative electrode tab. Alternatively, the negative electrode can include a negative electrode tab which is not a part of the negative electrode current collector.

In the nonaqueous electrolyte battery according to the first embodiment, since the deformation of a negative electrode active material layer in a plane direction can be suppressed as described above, the peeling-off of the negative electrode active material layer from the negative electrode current collector can also be suppressed. As a result, the nonaqueous electrolyte battery according to this aspect can more effectively suppress an increase in resistance.

The negative electrode active material layer includes particles of a niobium-and-titanium-containing composite oxide. The particles of the niobium-and-titanium-containing composite oxide can function as a negative electrode active material. The negative electrode active material layer can also further include other negative electrode active materials, a conductive agent, and a binder, for example.

The separator layer is provided between the positive electrode and the negative electrode. For example, the separator layer can be provided between the positive electrode active material layer and the negative electrode active material layer.

The positive electrode, the negative electrode and the separator layer can constitute the electrode group. The electrode group may be an electrode group having a stacked type structure. In the stacked type electrode group, positive electrodes and negative electrodes are alternately stacked while each of separators is sandwiched between one positive electrode and one negative electrode. Alternatively, the electrode group is a wound electrode group. The wound electrode group has a structure in which a stack obtained by alternately stacking a positive electrode and a negative electrode sandwiching a separator therebetween is spirally wound.

The negative electrode active material layer and the separator layer hold the gel nonaqueous electrolyte. For example, the negative electrode active material layer and the separator may be impregnated with the gel nonaqueous electrolyte. The positive electrode may be impregnated with the gel nonaqueous electrolyte. Alternatively, the nonaqueous electrolyte battery according to the first embodiment may further include a liquid nonaqueous electrolyte. The liquid nonaqueous electrolyte may be held in a state where an electrode group is impregnated with the liquid nonaqueous electrolyte, for example.

The nonaqueous electrolyte battery according to the first embodiment can further include a container member accommodating the electrode group, the gel nonaqueous electrolyte, and an optional liquid nonaqueous electrolyte.

The nonaqueous electrolyte battery according to the first embodiment can also further include a positive electrode terminal connected to the positive electrode, for example, via a positive electrode tab, and a negative electrode terminal connected to the negative electrode, for example, via a negative electrode tab. The container member may be provided with the positive electrode terminal and/or the negative electrode terminal.

Next, the positive electrode, the negative electrode, the separator layer, a carbonaceous material, a gel nonaqueous electrolyte, a liquid nonaqueous electrolyte, a container member, a positive electrode terminal, and a negative electrode terminal, each of which can be included in the nonaqueous electrolyte battery according to the first embodiment, will be described in more detail.

(Positive Electrode)

As the positive electrode current collector, an electronic conductive substrate of a metal or the like can be used, for example. Examples of the positive electrode current collector can include: a foil, a thin plate or a mesh made of a metal or an alloy such as aluminum, an aluminum alloy, stainless steel, or titanium.

As the positive electrode active material, for example, a chalcogenide such as a lithium-containing cobalt composite oxide, a lithium-containing nickel composite oxide, a lithium-containing nickel cobalt composite oxide, a lithium manganese composite oxide, and a lithium-containing nickel cobalt manganese composite oxide, can be used singly or in mixtures thereof. Among these, a composite oxide having a charge-and-discharge potential of 3.8 V or more with respect to the oxidation-reduction potential of lithium, such as the lithium-containing cobalt composite oxide, the lithium-containing nickel cobalt composite oxide, and the lithium-containing manganese composite oxide, can achieve a high battery capacity, which is desirable.

As the conductive agent, a material having an electronic conductivity, such as carbon particles, can be used, for example. Examples of the conductive agent can include acetylene black, carbon black, graphite, non-graphitizable carbon, and carbon nanotube.

As the binder, polytetrafluoroethylene (PTFE), polyvinylidene fluoride (PVdF), an ethylene-propylene diene copolymer, and styrene-butadiene rubber and the like can be used, for example.

The positive electrode active material and the conductive agent can be formed into a sheet shape by adding a binder thereto, followed by kneading and rolling. Alternatively, the positive electrode active material and the conductive agent can also be formed into a sheet shape by dissolving or suspending the positive electrode active material and the conductive agent in a solvent such as toluene or N-methylpyrrolidone (NMP) to prepare a slurry, applying the slurry onto a current collector to form a coated film, and drying the coated film.

(Negative Electrode)

As the negative electrode current collector, an electronic conductive substrate such as a metal, can be used, for example. Examples of the negative electrode current collector can include: a foil, a thin plate or a mesh made of metal, such as copper, stainless steel, nickel or the like.

The negative electrode active material layer, for example, includes a negative electrode active material including niobium-and-titanium-containing composite oxide, and is that obtained by using a conductive agent or a binder and the like and formed into a pellet shape, a thin plate shape, or a sheet shape.

As the niobium-and-titanium-containing composite oxide, for example, there can be used a composite oxide having a monoclinic crystal structure and represented by the general formula of $Li_aTiM_bNb_{2\pm\beta}O_{7\pm\sigma}$ (herein, for each subscript value, $0 \leq a \leq 5$, $0 \leq b \leq 0.3$, and $0 \leq \beta \leq 0.3$, and $0 \leq \sigma \leq 0.3$, and M is at least one (M may be one kind or two or more kinds) selected from the group consisting of Fe, V, Mo, and Ta), and a composite oxide having an orthorhombic crystal structure and represented by the general formula of $Li_{2+a1}M(I)_{2-b1}Ti_{6-c1}M(II)_{d1}O_{14+o1}$ (herein, for each subscript value, $0 \leq a1 \leq 6$, $0 < b1 < 2$, $0 < c1 < 6$, $0 < d1 < 6$, and $-0.5 \leq \sigma1 \leq 0.5$; M(I) is at least one (there can be one kind or two or more kinds) selected from the group consisting of Sr, Ba, Ca, Mg, Na, Cs, and K; and M(II) is Nb or a combination of Nb and at least one (There can be one kind or two or more kinds) selected from the group consisting of Zr, Sn, V, Nb, Ta, Mo, W, Fe, Co, Mn, and Al). Particularly, the monoclinic niobium-and-titanium-containing composite oxide has a large capacity per weight to allow a battery capacity to be increased, which is more desirable.

As the negative electrode active material other than the niobium-and-titanium-containing composite oxide, a lithium titanate ($Li_4Ti_5O_{12}$), a monoclinic titanium dioxide ($TiO_2$) or the like can be used, for example.

The negative electrode active material may be primary particles, secondary particles each formed by aggregation of the primary particles, or a mixture of the primary particles and the secondary particles. The average primary particle size of the negative electrode active material is preferably within a range of 50 nm to 10 μm. The average secondary particle size of the negative electrode active material is preferably within a range of 200 nm to 20 μm.

As the conductive agent, carbon particles can be used, for example. The carbon particles desirably have powder forms or fibrous powder forms and the like. Alternatively, other conductive agents such as acetylene black, carbon black, graphite, non-graphitizable carbon, and carbon nanotube can also be used.

As the binder, a polytetrafluoroethylene (PTFE), a polyvinylidene fluoride (PVdF), a styrene-butadiene rubber, and a carboxymethyl cellulose (CMC) and the like can be used, for example.

The negative electrode active material and the carbon particles can be formed into a pellet shape or a sheet shape by adding a binder to the negative electrode active material and the carbon particles, followed by kneading and rolling, for example. Alternatively, the negative electrode active material and the conductive agent can also be formed into a sheet shape by dissolving or suspending the negative electrode active material and the conductive agent in a solvent such as water or N-methylpyrrolidone (NMP) to prepare a slurry, applying the slurry onto a current collector to form a coated film, and drying the coated film.

(Separator Layer)

As insulating particles included in the separator layer, solid particles of metal oxide and particles of a Li-ion-conductive inorganic compound can be used, for example.

Examples of the metal oxide solid particles include particles made of a metal oxide such as alumina, zirconia, and silica. In particular, the separator layer can be more inexpensively and simply formed by using alumina or zirconia. At this time, alumina or zirconia having a low purity exhibits a function, but alumina or zirconia desirably has a high purity. By using the highly-pure alumina or zirconia, problems such as a surface side-reaction which is apt to occur in a high-temperature environment can be avoided. The particle size is desirably 0.1 to 5 µm as an average particle size. When the average particle size is 0.1 µm or less, an ion conductive path is limited, which causes an increase in internal resistance. When the average particle size is 5 µm or more, the number of particles between the positive electrode and the negative electrode is decreased, which means that it is highly possible that the positive electrode and the negative electrode are brought into contact with each other.

Examples of the particles of the Li-ion-conductive inorganic compound include particles including an inorganic compound such as lithium lanthanum zirconate (for example, $Li_7La_3Zr_2O_{12}$:LLZ, which can also contain a dopant), titanium-containing oxide having a defective perovskite structure ($La_{0.56}Li_{0.33}TiO_3$), a NASICON compound ($Li_{14}Zn(GeO_4)_4$), Li-β alumina, a LISICON compound ($L_{3.6}Si_{0.6}P_{0.4}O_4$), and glass ceramics ($Li_2S$—$SiS_2$—$Li_3PO_4$).

When the Li-ion-conductive inorganic compound particles are used, a Li-ion-conductivity is desirably $1 \times 10^{-10}$ $Scm^{-2}$ or more at room temperature. A Li ion concentration at a contact interface can be increased when the particles of the Li-ion-conductive inorganic compound according to this preferable example are mixed with the gel nonaqueous electrolyte. The particle size (diameter) of the Li-ion-conductive inorganic compound is preferably from 0.01 to 8 µm. Within this range, the ion conductivity can be improved. The particle size is more preferably from 0.05 to 0.2 µm. With the particle size of more than 8 µm, it is difficult for Li ions to diffuse into the surface when polarization occurs, and an effect is less likely to be obtained.

The separator layer can further include a binder. The binder can bind the insulating particles. As the binder, a polytetrafluoroethylene (PTFE), polyvinylidene fluoride (PVdF), a polyvinyl pyrrolidone, an acrylic binder, a styrene-butadiene rubber, and a carboxymethyl cellulose (CMC) and the like can be used, for example.

The gel nonaqueous electrolyte at least a part of which is held in the separator layer will be described later.

The separator layer can be formed according to the following procedure, for example. First, insulating particles are mixed with a binder using water, alcohol, NMP or the like as a solvent, to prepare a slurry. This slurry is applied to a substrate (for, example a positive electrode active material layer, a negative electrode active material layer, or an intermediate region) to form a coated film, and the coated film is dried to obtain a separator layer.

(Carbonaceous Material Included in Intermediate Region)

As the carbonaceous material included in the intermediate region, graphite, non-graphitizable carbon, a carbon fiber or the like can be used, for example. The carbonaceous material may be unevenly or uniformly dispersed in the intermediate region. The carbonaceous material desirably has an average particle size of 10 µm or less in order to minimize the inhibition of the ion conduction. In order to avoid the shielding of the negative electrode active material, the average particle size of the carbonaceous material is more desirably equal to or less than that of the negative electrode active material.

(Gel Nonaqueous Electrolyte)

As the gel nonaqueous electrolyte, there can be used one obtained by dissolving a lithium salt in a mixture prepared by mixing a polymer such as polyacrylonitrile (PAN), polyethylene oxide (PEO), polyvinylidene fluoride (PVdF), and polymethyl methacrylate, each of which can be gelated with carbonates, with a solvent conventionally used, for example. The concentration of the lithium salt is preferably from 0.2 to 2 M.

As the solvent, there can be used ethylene carbonate (EC), propylene carbonate (PC), dimethyl carbonate (DMC), methylethyl carbonate (MEC), diethyl carbonate (DEC), γ-butyrolactone (BL), acetonitrile (AN), ethyl acetate (EA), toluene, xylene, methyl acetate (MA) or the like, for example. As the lithium salt, there can be used a lithium salt such as lithium perchlorate ($LiClO_4$), lithium hexafluorophosphate ($LiPF_6$), lithium tetrafluoroborate ($LiBF_4$), lithium trifluoromethylsulfonate, lithium bis(trifluoromethylsulfonyl)imide (LiTFSI), or lithium bispentafluoroethylsulfonylimide. $LiPF_6$ or $LiBF_4$ is desirable since longer cycle performance can be obtained, and a mixed salt thereof may also be used.

(Liquid Nonaqueous Electrolyte)

As the liquid nonaqueous electrolyte, one obtained by dissolving the lithium salt described above in the solvent described above can be used, for example. The concentration of the lithium salt is preferably from 0.5 to 2 M.

(Container Member)

As the container member, a metal or resin can, or a laminate container member be used, for example. As the metal can, a square-shaped container made of aluminum, iron, stainless steel or the like can be used, for example. Alternatively, a square-shaped container made of plastics and ceramics or the like can also be used.

As the laminate container member, there can be used one obtained by combining a metal such as aluminum, copper, or stainless steel with a resin layer to give a laminate material, and forming the laminate material into a baggy shape by hot melt adhesion, for example. Particularly, the laminate container member is desirable since gas generation inside a battery can be detected as a change in the appearance of the battery.

(Positive Electrode Terminal)

The positive electrode terminal may be a metal ribbon, a metal plate, or a metal rod which is electrically connected to the positive electrode, for example. The positive electrode terminal can electrically work as a bridge between the exterior of the battery and the positive electrode in a state where the positive electrode terminal is connected to the positive electrode. For example, the metal ribbon welded to the positive electrode tab may be taken as the positive electrode terminal in a state where the metal ribbon is pulled out from the container member. Aluminum, titanium or the like can be used for the positive electrode terminal.

(Negative Electrode Terminal)

The negative electrode terminal may be a metal ribbon, a metal plate, or a metal rod which is electrically connected to the negative electrode, for example. The negative electrode terminal can electrically work as a bridge between the exterior of the battery and the negative electrode in a state where the negative electrode terminal is connected to the negative electrode. For example, the metal ribbon welded to the negative electrode tab may be taken as the negative electrode terminal in a state where the metal ribbon is pulled out from the container member. Aluminum, copper, stainless steel or the like can be used as the negative electrode terminal. Aluminum is desirable since it has a light weight and can exhibit an excellent weld-connecting property.

[Manufacturing Method]

The negative electrode active material layer, intermediate region, and separator layer of the nonaqueous electrolyte battery according to the first embodiment can be produced according to the following procedure, for example.

First, a negative electrode active material layer is formed. When the surface of the negative electrode active material layer is flat, the negative electrode active material layer is subjected to emboss processing in order to provide a recessed part, or the surface of the negative electrode active material layer is partially removed. Next, a powdered carbonaceous material is added onto the negative electrode active material layer. Next, a separator layer including insulating particles is formed on the powdered carbonaceous material. In this case, the insulating particles may be brought into contact with a part of the surface of the negative electrode active material layer. Next, the separator layer, the region including the carbonaceous material, and the negative electrode active material layer are impregnated with an electrolyte solution including a component (for example, a monomer, a low-molecular-weight polymer or the like) serving as the precursor of a gel nonaqueous electrolyte. Subsequently, the monomer, the low-molecular-weight polymer or the like included in the held electrolysis solution is polymerized to form a gel nonaqueous electrolyte. Thus, the negative electrode active material layer, intermediate region, and separator layer of the nonaqueous electrolyte battery according to the first embodiment can be obtained.

Alternatively, the negative electrode active material layer, intermediate region, and separator layer of the nonaqueous electrolyte battery according to the first embodiment can be produced also according to the following procedure.

First, a negative electrode active material layer is formed. Next, the negative electrode active material layer is impregnated with an electrolyte solution including a powdered carbonaceous material and a monomer or low-molecular-weight polymer serving as the precursor of a gel electrolyte. Subsequently, the monomer, the low-molecular-weight polymer or the like included in the electrolyte solution which is held in the negative electrode active material layer is polymerized, to form a gel nonaqueous electrolyte. Then, a separator layer including insulating particles is formed so that the separator layer is brought into contact with the powdered carbonaceous material. In this case, the insulating particles may be brought into contact with a part of the surface of the negative electrode active material layer.

Subsequently, the separator layer is impregnated with an electrolysis solution which includes not a powdered carbonaceous material but a monomer or low-molecular-weight polymer serving as the precursor of a gel nonaqueous electrolyte. Subsequently, the monomer or low-molecular-weight polymer and the like included in the electrolyte solution which is held in the separator layer is polymerized, to form a gel nonaqueous electrolyte. Also by such a method, the negative electrode active material layer, intermediate region, and separator layer of the nonaqueous electrolyte battery according to the first embodiment can be obtained.

After the negative electrode active material layer is formed in the procedures described above, local pressure can be applied to the surface of the negative electrode active material layer, to form a recessed part.

The forming and adding steps which are described above can be carried out by a method which includes applying a slurry including a binder to form a coated film, and thereafter drying the coated film, a sputtering, a vapor deposition, a spraying or the like.

Next, a nonaqueous electrolyte battery as an example according to the first embodiment will be described in detail with reference to the drawings.

Figure 4:
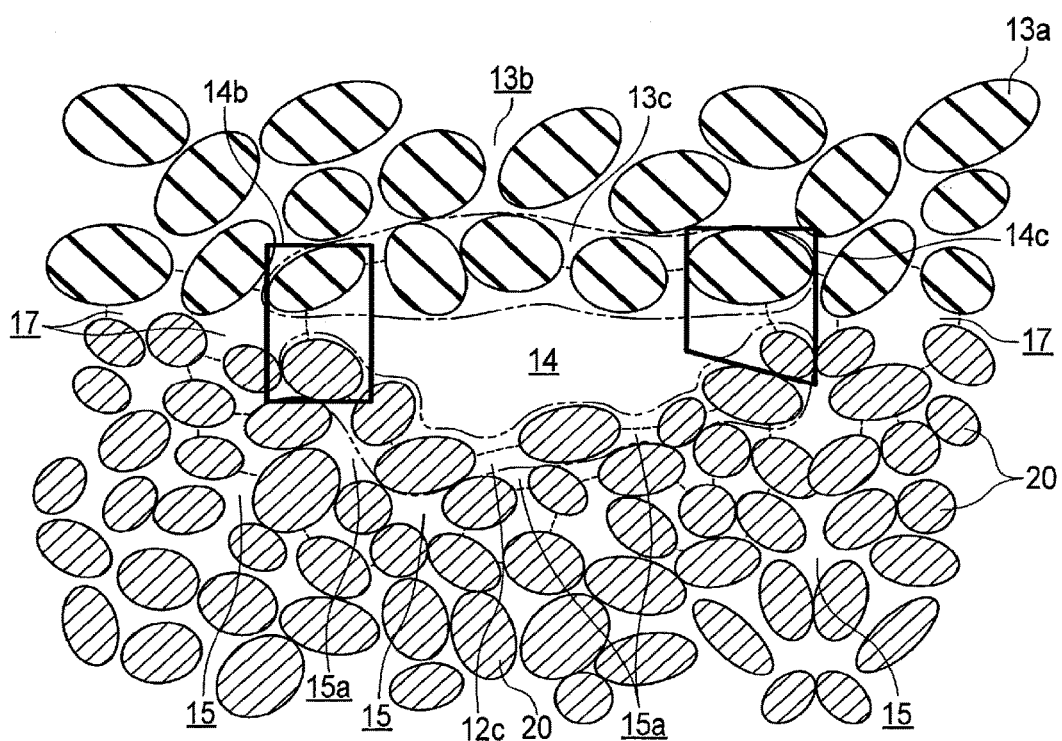
FIG. 4 is an enlarged cross-sectional view of a C portion in FIG. 3.

FIG. 1 is a schematic cross-sectional view of an example of a nonaqueous electrolyte battery according to a first embodiment; FIG. 2 is an enlarged cross-sectional view of an A portion in FIG. 1; FIG. 3 is an enlarged cross-sectional view of a B portion in FIG. 2; and FIG. 4 is an enlarged cross-sectional view of a C portion in FIG. 3.

A nonaqueous electrolyte battery 10 shown in FIGS. 1 to 4 includes a baggy container 2 shown in FIG. 1, and an electrode group 1 shown in FIGS. 1 and 2. The electrode group 1 is accommodated in the container 2.

The baggy container 2 is made of a laminate film including two resin layers and a metal layer sandwiched between the resin layers.

As shown in FIG. 1, the electrode group 1 is a wound electrode group in a flat form. The wound electrode group 1 in a flat form is formed by, spirally winding a stack obtained by stacking a separator layer 13, a negative electrode 12, a separator layer 13, a positive electrode 11, and a separator layer 13 in this order from the outside, as shown in FIG. 2, to form a coil and then press-forming the coil.

As shown in FIG. 2, the negative electrode 12 includes a negative electrode current collector 12b and a negative electrode active material layer 12a formed on each surface of the negative electrode current collector 12b. Although not illustrated, the negative electrode current collector 12b includes a part a surface of which the negative electrode active material layer 12a is not supported on. The part serves as a negative electrode tab.

The negative electrode active material layer 12a includes particles 20, as shown in FIGS. 3 and 4. Each of the particles 20 is a particle of a niobium-and-titanium-containing composite oxide. Although not shown, the negative electrode active material layer 12a further includes a conductive agent and a binder. The negative electrode active material layer 12a is impregnated with a gel nonaqueous electrolyte which is not illustrated. Therefore, gaps 15 among the particles 20 of the niobium-and-titanium-containing composite oxide 20 shown in FIGS. 3 and 4 include the conductive agent, the binder, and the gel nonaqueous electrolyte.

The surface of the negative electrode active material layer 12a is not flat, and has recessed parts 12c, as shown in FIGS. 3 and 4. An intermediate region 14 is adjacent to each of the recessed parts 12c. The intermediate region 14 includes carbonaceous material particles 14a and impregnated with the gel nonaqueous electrolyte. In FIG. 4, the illustration of the carbonaceous material particles in the intermediate region 14 is omitted.

The separator layer 13 is in contact with the negative electrode active material layer 12a at contact points 16, as shown in FIGS. 3 and 4. The intermediate region 14 is adjacent to the separator layer 13.

The separator layer 13 includes particles 13a, as shown in FIGS. 3 and 4. Each of the plurality of particles 13a is an insulating particle.

Although not illustrated, the separator layer 13 further includes a binder and a gel nonaqueous electrolyte. Therefore, gaps 13b among non-conductive particles shown in FIGS. 3 and 4 include a binder and a gel nonaqueous electrolyte.

The separator layer 13 has a thickness Ts, as shown in FIG. 2. The intermediate region 14 has a depth d in the thickness direction of the negative electrode active material layer 12a, as shown in FIG. 3.

As shown in FIGS. 3 and 4, a volume $V_A$ of the intermediate region 14 is larger than the volume of the gaps 15 among the particles 20 of the niobium-and-titanium-containing composite oxide in the negative electrode active material layer 12a. Specifically, a volume ratio $V_A/V_B$ is 5 or more. The volume $V_A$ is the volume of the intermediate region 14, and the volume $V_B$ is the average volume of the gaps 15 among the particles 20 of the niobium-and-titanium-containing composite oxide in the negative electrode active material layer 12a. A method for calculating the volume ratio $V_A/V_B$ will be described later with reference to FIG. 4.

A positive electrode 3 includes a positive electrode current collector 11b and a positive electrode active material layer 11a formed on each surface of the positive electrode current collector lib, as shown in FIG. 2. Although not illustrated, the positive electrode current collector 11b includes a part a surface of which the positive electrode active material layer 11a is not supported on. The part serves as a positive electrode tab. The positive electrode 3 is impregnated with the gel nonaqueous electrolyte, in the nonaqueous electrolyte battery shown in FIGS. 1 to 4.

The nonaqueous electrolyte battery 10 shown in FIGS. 1 to 4 further includes a negative electrode terminal 6 and a positive electrode terminal 7 which are shown in FIG. 1. The negative electrode terminal 6 is electrically connected to the negative electrode tab described above. Similarly, the positive electrode terminal 7 is electrically connected to the positive electrode tab. A part of each of the negative electrode terminal 6 and positive electrode terminal 7 is located outside the container 2.

<Various Measuring Methods>

Hereinafter, various measuring methods performed for a nonaqueous electrolyte battery will be described. Some methods are described with reference to the drawings for the sake of simplicity, but the nonaqueous electrolyte battery according to the first embodiment is not limited to the aspects described in the drawings.

[Method for Discriminating Intermediate Region included in Nonaqueous Electrolyte Battery]

Whether an intermediate region is included in a nonaqueous electrolyte battery can be discriminated by analyzing the cross-section of an electrode cut out from a battery as follows.

First, a battery is disassembled, and an electrode piece including one or more pairs of positive and negative electrodes is cut out. Next, the cross-section of this electrode piece is observed with a scanning electron microscope (SEM), to identify a pair of positive and negative electrode current collectors which are opposed to each other.

Next, a boundary between a separator layer, which is located between the positive and negative electrodes, and the positive electrode is discriminated as a boundary A from a SEM image.

Next, a boundary between the negative electrode current collector and a negative electrode active material layer is discriminated as a boundary B. An elemental mapping image for a region between the boundary A and the boundary B is obtained. Elemental mapping can be performed with an electron probe microanalyzer (EPMA), for example. The concentration of each element more than one half of the average value of the concentration of each element in the whole region between the boundary A and the boundary B is defined as the existence range of each element. For example, when the negative electrode active material layer is determined to be the existence range of niobium and/or titanium, the negative electrode active material layer can be determined to be a layer including the negative electrode active material containing niobium and/or titanium. When the separator layer is determined to be the existence range of aluminum and/or zirconium, the separator layer can be determined to be a separator layer including these elements. The negative electrode active material layer and the separator layer are deducted from the whole region in which the elemental mapping is performed. If carbon is detected in a residual region which is adjacent to both the negative electrode active material layer and the separator layer, and this region including particles can be confirmed from the SEM image, the region can be determined to be the intermediate region including a carbonaceous material.

[Method for Calculating Volume Ratio $V_A/V_B$]

A method for calculating a volume ratio $V_A/V_B$ of a nonaqueous electrolyte battery including an intermediate region ($V_A$: volume of intermediate region; $V_B$: average volume of gaps among active material particles (for example, particles of a niobium-and-titanium-containing composite oxide) in negative electrode active material layer) will be described later.

First, a volume ratio $V_A/V_B$, wherein, $V_A$ is a volume of an intermediate region, and $V_B$ is an average volume of gaps among between active material particles, can be considered to be equivalent to an area ratio $S_A/S_B$, wherein $S_A$ is an area of the intermediate region in the cross-sections of a negative electrode and separator layer and $S_B$ is an average area of the gaps among active material particles. Here, the unit of the volume $V_A$ is $cm^3$. The unit of the volume $V_B$ is $cm^3$, too. The unit of the area $S_A$ is $cm^2$. The unit of the area $S_B$ is $cm^2$, too.

Next, the method for calculating the volume ratio $V_A/V_B$ will be specifically described with reference to FIG. 4. In this calculating method, as shown in FIG. 4, a cross-sectional SEM image in which an intermediate region and a region being adjacent to the intermediate region are present in view is used.

First, particles 13a included in a region 13c of a separator layer 13 which is adjacent to a region determined to be an intermediate region 14 in the SEM image according to the procedure described above are connected at nearest neighbor points as shown by a broken line in FIG. 4. On the other hand, similarly, negative electrode active material particles 20 included in a region (recessed part) 12c of a negative electrode active material layer 12a which is adjacent to the region determined to be the intermediate region 14 are connected at nearest neighbor points as shown by a broken line in FIG. 4. In each of a region 14b which is adjacent to the left end of the intermediate region 14 and a region 14b which is adjacent to the right end of the intermediate region 14 in FIG. 4, the particle 13a included in the separator layer 13 and the negative electrode active material particle 20 are connected at nearest neighbor points as shown by a broken line in FIG. 4.

The area of a region surrounded with the particles 13a included in the region 13c of the separator layer 13, the particles 20 included in the region 12c of the negative electrode active material layer 12a, the particle 13a and particle 20 included in each of the regions 14b and 14c, broken lines as described above is defined as the area $S_A$ of the intermediate region 14, and is measured.

On the other hand, the areas of gaps 15 between the particles 20 of the negative electrode active material in the negative electrode active material layer 12a are measured. The area of each of the gaps 15 is defined as the area of a region surrounded with broken lines each connecting the particles 20 of the negative electrode active material at nearest neighbor points, and measured, as shown in FIG. 4. Herein, the gaps 15 are representatively selected as a region 15a which is adjacent to the intermediate region 14 with the connecting broken lines sandwiched. The average value of the areas of the gaps 15 thus measured is defined as the average area $S_B$ of the gaps 15, and calculated.

The area ratio $S_A/S_B$ of the area $S_A$ to the average area $S_B$, measured as described above, is taken as the volume ratio $V_A/V_B$ of the volume $V_A$ of the intermediate region 14 to the average volume $V_B$ of the gaps 15 among the active material particles 20.

[Method for Calculating Volume Ratio $V_A/V_C$]

The volume ratio $V_A/V_C$ ($V_A$: volume of intermediate region; $V_C$: the average volume of the gaps among the active material particles and the insulating particles in portions with each of which the negative electrode active material layer and the separator layer are in contact (for example, average volume of gaps among the particles of the niobium-and-titanium-containing composite oxide and the insulating particles)) for the nonaqueous electrolyte battery including the intermediate region can be measured according to the following procedures. Hereinafter, the measuring method will be described with reference to FIG. 4.

First, as described above, an area $S_A$ of an intermediate region 14 is measured. On the other hand, as shown by a broken line in FIG. 4, at contact points 16 between a negative electrode active material layer 12a and a separator layer 13, the particles 13a included in the separator layer 13 and the particles 20 of the negative electrode active material are connected at nearest neighbor points. The area of a region surrounded with the particles 13a, the negative electrode active material particles 20, and the broken lines connecting them at nearest neighbor points at the contact points 16 is defined as the area of gaps 17 among the particles 20 of the negative electrode active material and the insulating particles 13a at the contact points 16, and measured. The areas of gaps 17 included in the contact point 16 with the intermediate region 14 sandwiched therebetween are measured. The average value of the areas of the gaps 17 thus measured is defined as the average area. $S_C$ of the gaps 17, and measured.

An area ratio $S_A/S_C$ of the area $S_A$ to the average area $S_C$, wherein $S_A$ and $S_c$ are measured as described above, is taken as a volume ratio $V_A/V_C$ of the volume $V_A$ of the intermediate region 14 to the average volume $V_C$ of the gaps 17. Here, the unit of the area $S_C$ is cm². The unit of the volume $V_C$ is cm³.

[Measurement of Content of Carbonaceous Material in Intermediate Region]

The content of the carbonaceous material in the intermediate region can be measured according to the following procedures. First, the areas of carbonaceous material particles included in the intermediate region from the cross-sectional SEM image are measured. By dividing the areas of the carbonaceous material particles by the area $S_A$ of the intermediate region measured by the method described above, the area percentage of the carbonaceous material particles in the intermediate region is obtained. By dividing the area percentage of the carbonaceous material particles in the intermediate region by the specific gravity of the carbonaceous material, the weight of the carbonaceous material particles included in 1 cm³ of the intermediate region can be calculated. On the other hand, by reducing the area percentage of the carbonaceous material particles obtained above from 1, the area percentage of the gel nonaqueous electrolyte in the intermediate region is obtained. By dividing the area percentage of the gel nonaqueous electrolyte in the intermediate region by the specific gravity of the gel nonaqueous electrolyte, the weight of the gel nonaqueous electrolyte included in 1 cm³ of the intermediate region can be calculated. By dividing the weight of the carbonaceous material particles included in 1 cm³ of the intermediate region by the sum of the weights of the carbonaceous material and gel nonaqueous electrolyte contained in 1 cm³ of the intermediate region, the content of the carbonaceous material in the intermediate region can be obtained.

[Identification Method of Active Material]

The active material included in the negative electrode of the nonaqueous electrolyte battery can be identified by a powder X-ray diffraction (XRD) and inductively coupled plasma (ICP) emission spectroscopy, each of which is described below.

(Pretreatment)

At first, a battery to be measured is put into a completely discharged state. Even in a state in which the battery is discharged, lithium ions remaining in the active material may be present. However, the results of X-ray diffraction described below may not be greatly affected.

Next, the battery is disassembled in a glove box filled with argon. A negative electrode is taken out of the disassembled battery. The taken-out electrode is washed with an appropriate solvent. For example, ethylmethyl carbonate may be used. And then, the negative electrode is subjected to a drying under reduced pressure. After the drying, the confirmation is performed whether a white precipitate such a lithium salt does not exist on a surface of the negative electrode.

When the XRD measurement is to be performed, the washed negative electrode is cut into a piece having the same area of the holder of the wide-angle X-ray diffractometer, and the piece is used as a measurement sample.

When the composition analysis is to be performed, as described below, an active material is recovered from the washed electrode, and the recovered active material is subjected to the composition analysis.

(Method of Obtaining X-Ray Diffraction Pattern of Active Material According to Powder X-Ray Diffraction Measurement)

The active material is subjected to a X-ray diffraction measurement according to following procedures. First, the measurement sample which was obtained as described above is affixed directly to the glass holder. Next, the glass holder is installed into powder X-ray diffractometer, and an X-ray diffraction (XRD) pattern is obtained by using Cu-Kα ray.

As an apparatus for powder X-ray diffraction measurement, SmartLab manufactured by Rigaku is used. Measurement is performed under the following condition: Cu target; 45 kV, 200 mA; soller slit: 5 degrees in both incident light and received light; step width: 0.02 deg; scan speed: 20 deg/min; semiconductor detector: D/teX Ultra 250; sample plate holder: flat glass sample plate holder (0.5 mm in thickness); measurement range: 5°≤2θ≤90°. When another apparatus is used, measurement using a standard Si powder for powder X-ray diffraction is performed under conditions where a peak intensity and a peak top position correspond to those by obtained using the above apparatus so as to obtain measurement results equivalent to those described above.

The X-ray diffraction (XRD) pattern obtained herein must be applicable to Rietveld analysis. In order to collect the data for Rietveld analysis, the measurement time or X-ray intensity is appropriately adjusted in such a manner that the step width is made ⅓ to ⅕ of the minimum half width of the diffraction peaks, and the intensity at the peak position of strongest reflected intensity is 5,000 cps or more.

The XRD pattern obtained as described above is analyzed by the Rietveld method. In the Rietveld method, the diffraction pattern is calculated from the crystal structure model which has been previously estimated. The parameters of the crystal structure (lattice constant, atomic coordinate, and crystal site occupancy ratio or the like) can be precisely analyzed by fitting all the calculated values and measurement values. Thereby, the characteristics of the crystal structure of the synthesized composite oxide can be determined. The site occupancy ratio of constitutional elements in each of the sites can be determined. A fitting parameter S is used as the scale for estimating the degree of agreement between the measured reflection patterns and the calculated patterns in the Rietveld analysis. The S value must be less than 1.8 in the analysis. When determining the occupancies in each of the sites, the standard deviation $\sigma_j$ must be taken into consideration. The fitting parameter S and standard deviation $\sigma_j$ defined herein are estimated using the formula described in "Funmatsu X sen Kaisetsu no Jissai (Reality of Powder X-Ray Analysis", X-Ray Analysis Investigation Conversazione, The Japan Society for Analytical Chemistry, written and edited by Izumi Nakai and Fujio Izumi (Asakura Publishing Co., Ltd.).

When the powder X-ray diffraction measurement is performed, the position of the peak originated from the electrode substrate such as a metal foil is previously measured. The peaks of other components such as a conductive agent and a binder are also previously measured. When the peaks of the substrate and active material overlap to each other, it is desirable that the layer including the active material (e.g., the active material layer) is separated from the substrate, and subjected to measurement. This is a process for separating the overlapping peaks when the peak intensity is quantitatively measured. For example, the active material layer can be separated by irradiating the electrode substrate with an ultrasonic wave in a solvent. The active material layer is inserted into the capillary, mounted on the rotary sample table, and measured. As a result of this process, the XRD pattern of the active material can be obtained with the influence of the orientation reduced.

According to the procedures as described above, information on a crystal structure of an active material included in the negative electrode can be obtained. Furthermore, according to the measurement as described above, symmetry of an active material to be measured can be found.

<Method of Confirmation of Composition of Composite Oxide>

The composition of the active material can be confirmed, for example, by means of inductively coupled plasma (ICP) emission spectroscopy. Should be noted that abundance ratio of each element depends on the sensitivity of the measurement apparatus. Therefore, for example, the composition of the active material confirmed by ICP emission spectroscopy may be deviated from the elemental ratio described above by a factor corresponding to the measurement apparatus.

In order to confirm the composition of the negative electrode material incorporated in the battery by means of ICP emission spectroscopy is specifically performed according to the following procedures. First, according to the procedures described above, the negative electrode is taken out from the nonaqueous electrolyte and washed. The washed negative electrode is put into an appropriate solvent and irradiated to an ultrasonic. For example, by putting an electrode body into ethylmethyl carbonate in a glass beaker and vibrating the electrode body in an ultrasonic washer, a negative electrode active material-containing layer can be peeled off a negative electrode current collector. Next, the peeled negative electrode active material-containing layer is dried under reduced pressure. By grinding the obtained negative electrode active material-containing layer in a mortar or the like, a powder including the active material to be measured, a conductive auxiliary, a binder and the like is obtained. By dissolving the powder by acid, a liquid sample including the active material can be prepared. At that time, hydrochloric acid, nitric acid, sulfuric acid, hydrogen fluoride or the like can be used as acid. By subjecting the liquid sample to ICP emission spectral analysis, the composition of the negative electrode active material can be found.

The calculated values of the X-ray diffraction pattern, which are described above, can be obtained based on the composition of the negative electrode active material according to the ICP composition analysis.

[Method for Measuring Particle Size]

The particle sizes of the negative electrode active material particles included in the negative electrode can be measured from the SEM image. The particle sizes of the carbonaceous material particles included in the intermediate region can be measured from the SEM image. The particle sizes of the insulating particles can be measured from the SEM image. The particle size of each of the above particles can also be measured by removing the gel electrolyte by means of a high-temperature treatment, and thereafter using a particle size distribution meter.

The nonaqueous electrolyte battery according to the first embodiment described above includes an intermediate region between a negative electrode active material layer including niobium-and-titanium-containing composite oxide and a separator layer. This intermediate region includes a carbonaceous material, and holds a gel nonaqueous electrolyte. A volume ratio $V_A/V_B$ is 5 or more. Therefore, the nonaqueous electrolyte battery according to the first embodiment described above can exhibit an excellent cycle life performance.

Second Embodiment

According to a second embodiment, there is provided a battery pack. The battery pack includes the nonaqueous electrolyte battery according to the first embodiment.

The battery pack according to the second embodiment can include one or more nonaqueous electrolyte batteries (unit cells) according to the first embodiment described above. The nonaqueous electrolyte batteries included in the battery pack according to the second embodiment can be electrically connected in series, in parallel, or with a combination of series connection and parallel connection. The nonaqueous electrolyte batteries can be connected to each other to constitute a battery module. The battery pack according to the second embodiment may include battery modules.

The battery pack according to the second embodiment may further comprise a protective circuit. The protective circuit has a function to control charging and discharging of the nonaqueous electrolyte battery. Alternatively, a circuit included in an equipment where the battery pack serves as a power source (for example, electronic devices, vehicles, and the like) may be used as the protective circuit for the battery pack.

Moreover, the battery pack according to the second embodiment may further comprise an external power distribution terminal. The external power distribution terminal is configured to externally output the current from the nonaqueous electrolyte battery, and to input the current to the nonaqueous electrolyte battery. In other words, when the battery pack is used as a power source, the current is externally provided via the external power distribution terminal. Also, when the battery pack is charged, the charging current (including regenerative energy caused by power of vehicles such as automobiles) is provided to the battery pack via the external power distribution terminal.

Next, a battery pack as an example according to the second embodiment will be described with reference to the drawings.

Figure 5:
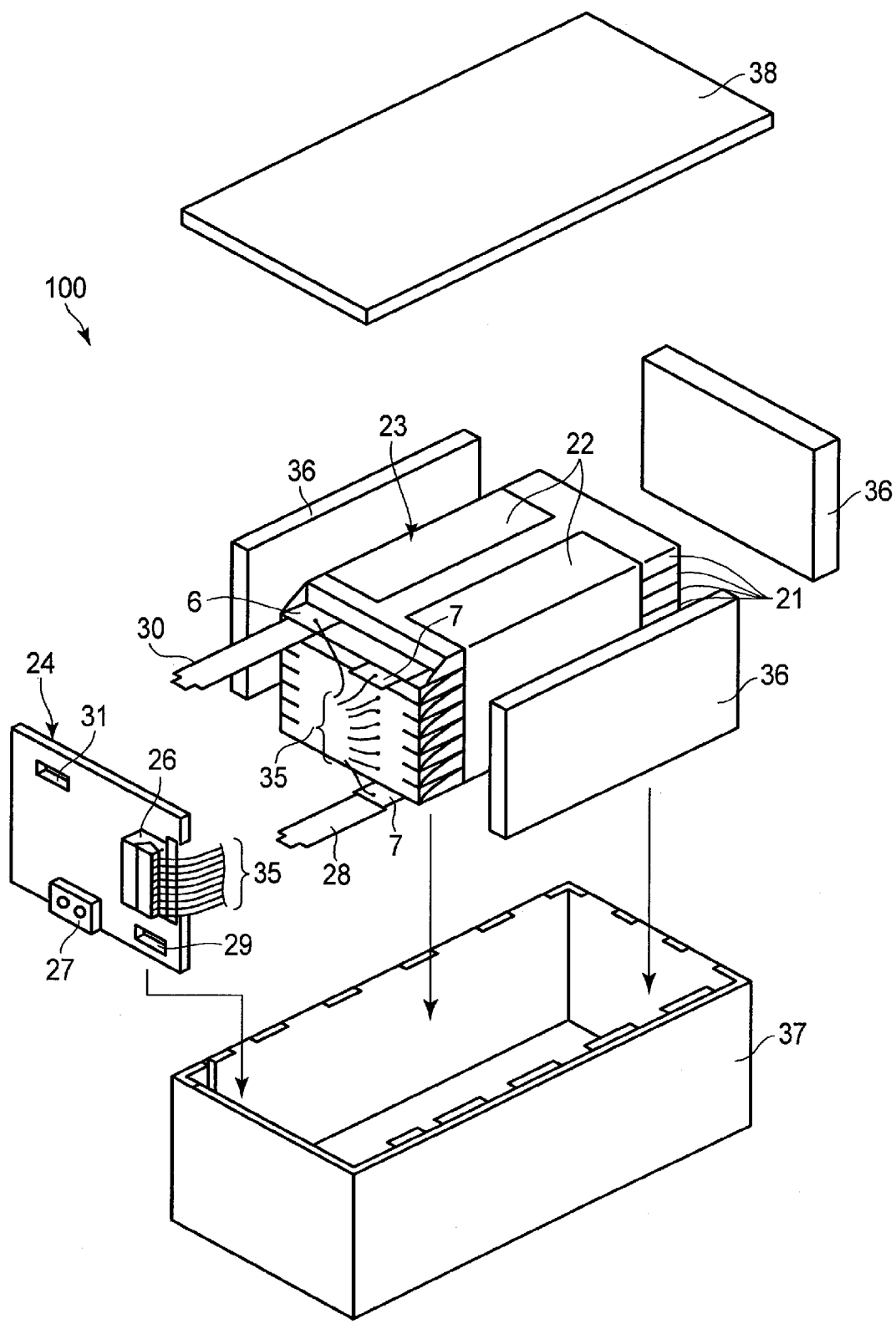
FIG. 5 is a schematic exploded perspective view of an example of a battery pack according to a second embodiment.
Figure 6:
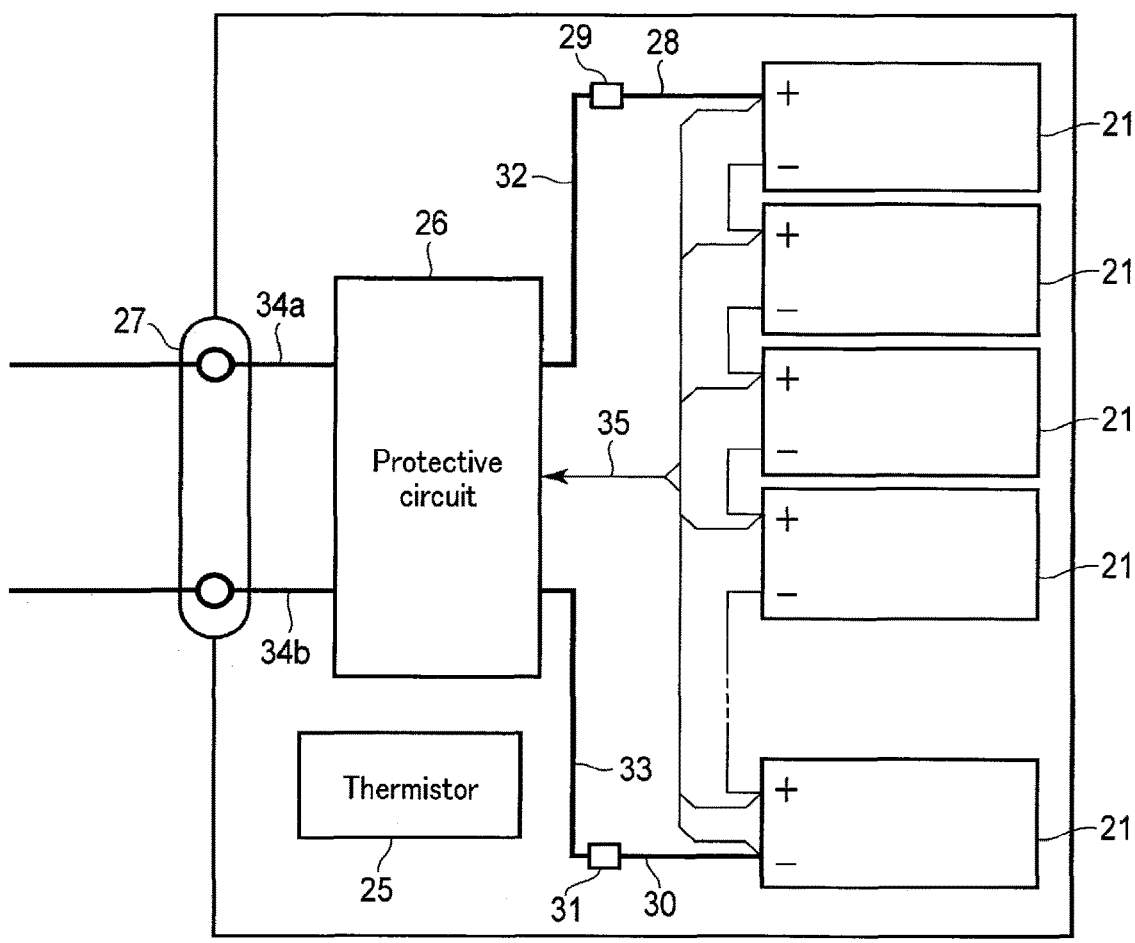
FIG. 6 is a block diagram showing an electric circuit of the battery pack in FIG. 5.

FIG. 5 is an exploded perspective view showing one example of a battery pack according to a second embodiment. FIG. 6 is a block diagram showing an electric circuit of the battery pack in FIG. 5.

A battery pack 100 shown in FIGS. 5 and 6 includes unit cells 21. Each of the unit cells 21 is the flat-type nonaqueous electrolyte battery 10 described with reference to FIGS. 1 to 4.

The unit cells 21 are stacked so that the negative electrode terminal 6 and the positive electrode terminal 7 extended outside are arranged in the same direction, and fastened with an adhesive tape 22 to constitute a battery module 23. The unit cells 21 are electrically connected to each other in series as shown in FIG. 6.

A printed wiring board 24 is arranged opposed to the side plane where the negative electrode terminal 6 and the positive electrode terminal 7 of the unit cell 21 are extended. A thermistor 25, a protective circuit 26, and a power distribution terminal 27 to an external device are mounted on the printed wiring board 24 as shown in FIG. 6. An electric insulating plate (not shown) is attached to the surface of the printed wiring board 24 facing the battery module 23 to avoid unnecessary connection of the wiring of the battery module 23.

A positive electrode-side lead 28 is connected to the positive electrode terminal 7 located at the bottom layer of the battery module 23 and the distal end of the lead 28 is inserted into a positive electrode-side connector 29 of the printed wiring board 24 so as to be electrically connected. An negative electrode-side lead 30 is connected to the negative electrode terminal 6 located at the top layer of the battery module 23 and the distal end of the lead 30 is inserted into an negative electrode-side connector 31 of the printed wiring board 24 so as to be electrically connected. The connectors 29 and 31 are connected to the protective circuit 26 through wiring 32 and 33 formed in the printed wiring board 24.

The thermistor 25 detects the temperature of the unit cells 21 and the detection signal is sent to the protective circuit 26. The protective circuit 26 can shut down a plus-side wirer 34a and a minus-side wirer 34b between the protective circuit 26 and the power distribution terminal 27 to an external device under a predetermined condition. The predetermined condition indicates, for example, the case where the temperature detected by the thermistor 25 becomes a predetermined temperature or more. Another example of the predetermined condition indicates the case where the over-charge, over-discharge, or over-current of the unit cells 21 is detected. The detection of the over-charge and the like is performed on each of the unit cells 21 or the whole of the battery module 23. When each of the unit cells 21 is detected, the cell voltage may be detected, or positive electrode or negative electrode potential may be detected. In the case of the latter, a lithium electrode to be used as a reference electrode is inserted into each of the unit cells 21. In the case of the battery pack 100 of FIGS. 5 and 6, wiring 35 for voltage detection is connected to each of the unit cells 21. Detection signals are sent to the protective circuit 26 through the wiring 35.

Protective sheets 36 including rubber or resin are arranged on three side planes of the battery module 23 except the side plane from which the positive electrode terminal 7 and the negative electrode terminal 6 are protruded.

The battery module 23 is housed in a housing container 37 together with each of the protective sheets 36 and the printed wiring board 24. That is, the protective sheets 36 are arranged on both internal surfaces in a long side direction and on one internal surface in a short side direction of the housing container 37. The printed wiring board 24 is arranged on the other internal surface in a short side direction. The battery module 23 is located in a space surrounded by the protective sheets 36 and the printed wiring board 24. A lid 38 is attached to the upper surface of the housing case 37.

In order to fix the battery module 23, a heat-shrinkable tape may be used in place of the adhesive tape 22. In this case, the battery module is bound by placing the protective sheets on the both sides of the battery module, revolving the heat-shrinkable tape, and thermally shrinking the heat-shrinkable tape.

In FIGS. 5 and 6, the structure in which the unit cells 21 are connected to each other in series is shown. In order to increase the battery capacity, the unit cells may be connected to each other in parallel. Alternatively, the unit cells can be connected in combination of series and parallel. Furthermore, the assembled battery packs can be connected to each other in series and/or in parallel.

The aspect of the battery pack according to the second embodiment may be appropriately changed depending on its application. The applications of the battery pack according to the second embodiment are preferably those for which cycle characteristics when large-current is taken out are desired. Specific examples of these applications include application as a battery of a digital camera, application to a vehicle such as a two- or four-wheeled hybrid electric vehicle, a two- or four-wheeled electric vehicle or a power-assisted bicycle, applications as a stationary battery, and application as a battery for rail way car. Particularly preferably, the battery pack according to the second embodiment is used for a battery mounted to a vehicle.

In a vehicle having the battery pack according to the second embodiment mounted, the battery pack is configured to, for example, recover regenerative energy caused by a power of the vehicle. Examples of the vehicle include two to four-wheeled hybrid electric automobiles, two to four-wheeled electric automobiles, electric assist bicycles, and trains (electric trains).

Figure 7:
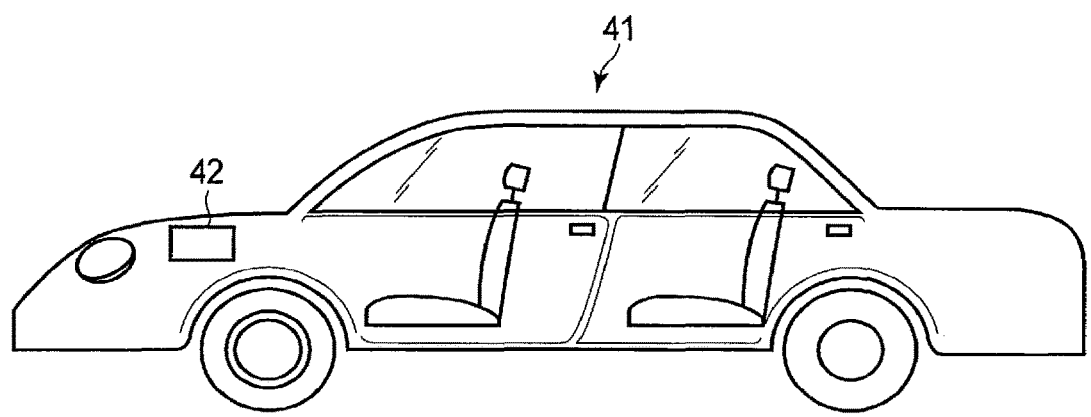
FIG. 7 is a schematic sectional view showing an example of a vehicle which includes an example of a battery pack according to a second embodiment.

FIG. 7 is a schematic sectional view showing an example of a vehicle which includes an example of a battery pack according to a second embodiment.

The vehicle 41 shown in FIG. 7 is an automobile. The automobile 41 includes a battery pack 42 which is an example of the battery pack according to the second embodiment mounted in its engine room. The mounting position is not limited to engine rooms. For example, the battery pack may also be mounted in rear parts of automobiles or under seats.

The battery pack according to the second embodiment includes the nonaqueous electrolyte battery according to the first embodiment. Therefore, the battery pack according to the second embodiment can exhibit an excellent cycle life performance.

EXAMPLES

Hereinafter, Examples will be described in detail.

Example 1

In Example 1, a nonaqueous electrolyte battery of Example 1 was produced according to the following procedures.

[Production of Positive Electrode]

90% by weight of powder of lithium-containing nickel cobalt manganese composite oxide ($LiNi_{1/3}Co_{1/3}Mn_{1/3}O_2$) having a particle size of 5 μm (D50 value) as a positive electrode active material, 2% by weight of acetylene black and 3% by weight of artificial graphite (3 μm in D50) as a conductive agent, and 5% by weight of polyvinylidene fluoride as a binder were added to N-methylpyrrolidone (NMP) as a solvent, followed by mixing, to prepare a slurry. The obtained slurry was applied to both surfaces of an aluminum foil having a thickness of 15 μm as a positive electrode current collector. In this case, a 5-mm unapplied portion was left on each edge of the aluminum foil in the length direction. Next, the applied film was dried, and then rolled. Thus, positive electrode active material layers each having a width of 67 mm and a length of 92 mm was produced on both surfaces of the aluminum foil. An aluminum ribbon having a width of 5 mm and a thickness of 0.1 mm was welded to each unapplied portion of the aluminum foil at three places to produce a positive electrode tab.

Thus, a positive electrode was produced.

[Production of Negative Electrode]

90% by weight of a powder of monoclinic niobium-and-titanium-containing composite oxide ($Nb_2TiO_7$) having an average particle size of 3 μm as a negative electrode active material, 5% by weight of artificial graphite as a conductive agent, and 5% by weight of polyvinylidene fluoride (PVdF) as a binder were added to an N-methylpyrrolidone (NMP) solvent, followed by mixing, to prepare a slurry. The obtained slurry was applied to both surfaces of an aluminum foil having a thickness of 25 μm as a negative electrode current collector. At this time, one end part (width: 5 mm) parallel to the length direction of the aluminum foil was taken as an unapplied portion. Subsequently, the applied film was dried.

Next, a pressurization roll having a concave-convex surface was pushed against the dried applied film to perform rolling. Thus, grooves each having a depth of 5 μm from a surface were formed in the dried applied film. Thus, a negative electrode including a negative electrode active material layer having a concave-convex surface was obtained.

[Formation of Precursor Region of Intermediate Region]

Next, 10% by weight of artificial graphite having an average particle size of 3 μm as a carbonaceous material and 10% by weight of polyvinylidene fluoride (PVdF) as a binder were added to an N-methylpyrrolidone (NMP) solvent, followed by mixing, to prepare a slurry. The slurry thus obtained was applied to the surface of the negative electrode active material layer. Then, the applied surface was lightly rubbed by a cellulose nonwoven fabric, to remove a part of the slurry located in a portion other than the grooves. Subsequently, the surface of the negative electrode active material layer was hot-air dried.

[Formation of Separator Layer]

Next, alumina particles having an average particle size of 0.5 μm as particles of non-electronic conductive solid, 3% by weight of carboxymethyl cellulose as a binder, and 3% by weight of styrene-butadiene rubber were added to water as a solvent, followed by mixing, to prepare a slurry. The slurry thus obtained was applied to the surface of the hot-air dried negative electrode active material layer to form an applied film, and the applied film was dried. Thus, a stack including a separator layer being in contact with a part of the surface of the negative electrode active material layer was obtained. The separator layer had a thickness of 20 μm.

[Attachment of Negative Electrode Tab]

Next, the stack obtained as described above was cut to a size of a width of 68 mm and a length of 93 mm. Subsequently, an aluminum ribbon having a width of 5 mm and a thickness of 0.1 mm was welded to the portion left as the unapplied portion as described above at three places, to produce a negative electrode tab.

Thus, the stack including the negative electrode and the separator layer was obtained.

[Assembly of Electrode Group]

The same procedure as that described above was repeated to produce ten positive electrodes, and ten stack each including the negative electrode and the separator layer.

Next, the positive electrode, and the stack including the negative electrode and the separator layer were stacked ten times in this order, to produce an electrode group. Next, the positive electrode tabs were welded to an aluminum sheet having a thickness of 0.1 mm, a width of 30 mm, and a length of 50 mm in a state where the positive electrode tabs were overlapped with each other, to produce a positive electrode terminal 5. Similarly, the negative electrode tabs were welded to an aluminum sheet having a thickness of 0.1 mm, a width of 30 mm, and a length of 50 mm in a state where the negative electrode tabs were overlapped with each other, to produce a negative electrode terminal 6.

The electrode group thus obtained was accommodated in an aluminum laminate container member.

[Preparation of Gel Nonaqueous Electrolyte Precursor]

Propylene carbonate (PC) and diethyl carbonate (DEC) were mixed at a volume rate of 1:2 to obtain a mixed solvent. $LiPF_6$ was dissolved at a concentration of 1 M in the mixed solvent, and an acrylic monomer and a polymerization initiator were added thereto. Thus, a gel nonaqueous electrolyte precursor was prepared.

[Assembly of Nonaqueous Electrolyte Battery]

Ten g of the gel nonaqueous electrolyte precursor thus obtained was added into the aluminum laminate container member accommodating the electrode group. Next, the precursor was made to gelation by heating. Subsequently, the aluminum laminate container member was closed by heat sealing. Thus, a nonaqueous electrolyte battery of Example 1 was produced.

[Charge-and-Discharge Cycle Test]

The nonaqueous electrolyte battery of Example 1 thus obtained was subjected to a charge-and-discharge cycle test under the following conditions.

The test was performed in an environment of 25° C. A charge maximum voltage was set to 2.8 V, and a discharge cut-off voltage was set to 1.5 V. First, constant-current constant-voltage charge was carried out at a current of 0.2 IA (current value: 0.2 C) for a total of 10 hours. Specifically, the nonaqueous electrolyte battery of Example 1 was subjected to constant-current charge at a current value of 0.2 C until a voltage reached 2.8 V. Subsequently, the nonaqueous electrolyte batter was subjected to constant-current charge at a voltage of 2.8 V. Then, the nonaqueous electrolyte battery of Example 1 was discharged at a current of 0.2 IA. A pause time between charge and discharge was set to 10 minutes, and the set of the charge and discharge was taken as a charge-and-discharge cycle. This charge-and-discharge cycle of the nonaqueous electrolyte battery of Example 1 was repeated 200 times.

The ratio of a discharge capacity in the 200th discharge to a discharge capacity in the first discharge was calculated as a discharge capacity retention ratio.

Example 2

In Example 2, a nonaqueous electrolyte battery of Example 2 was produced according to the same procedures as those of Example 1 except that a slurry for producing a negative electrode active material layer was prepared according to the following procedures.

In Example 2, 80% by weight of a powder of orthorhombic niobium-and-titanium-containing composite oxide $Li_2Na_{1.5}Ti_{5.5}Nb_{0.5}O_{14}$ having an average particle size of 5 µm as a negative electrode active material, 10% by weight of artificial graphite (3 µm in D50) as a conductive agent, and 10% by weight of polyvinylidene fluoride (PVdF) as a binder were added to an N-methylpyrrolidone (NMP) solvent as a solvent, followed by mixing, to prepare a slurry. A negative electrode was obtained according to the same procedures as those of Example 1 using this slurry.

Example 3

In Example 3, a nonaqueous electrolyte battery of Example 3 was produced according to the same procedures as those of Example 1 except that aluminum-containing lithium lanthanum zirconate $Li_{6.25}Al_{0.25}La_3Zr_3O_{12}$ having an average particle size of 1.3 µm was used as particles of a non-electronic conductive solid. A separator layer included in the nonaqueous electrolyte battery of Example 3 had a thickness of 20 µm.

Comparative Example 1

In Comparative Example 1, a nonaqueous electrolyte battery of Comparative Example 1 was produced according to the same procedures as those of Example 1 except that an applied film was rolled using a pressurization roll having no concave-convex surface when a negative electrode was produced, and a slurry including graphite was not applied to the surface of a negative electrode active material layer.

[Test]

(Charge-and-Discharge Cycle Test)

Each of the nonaqueous electrolyte batteries of Examples 2 and 3 and Comparative Example 1 was subjected to a charge-and-discharge cycle test in the same manner as in the nonaqueous electrolyte battery of Example 1.

The discharge capacity retention ratios of the nonaqueous electrolyte batteries of Examples 1 to 3 and Comparative Example 1 were 88.2%, 90.1%, 91.8%, and 70.1%, respectively.

(Measurement of Volume Ratio $V_A/V_B$)

A volume ratio $V_A/V_B$ of a volume $V_A$ of the intermediate region to an average volume $V_B$ of gaps among particles of niobium-and-titanium-containing composite oxide in the negative electrode active material layer for each of the nonaqueous electrolyte batteries of Examples 1 to 3 and Comparative Example 1 was measured according to the procedures described above. The volume ratios $V_A/V_B$ of the nonaqueous electrolyte batteries of Examples 1 to 3 and Comparative Example 1 were 13.8, 5.9, 13.6, and 0, respectively.

[Measurement of Content of Carbonaceous Material of Intermediate Region}

The content of the carbonaceous material in the intermediate region for each of the nonaqueous electrolyte batteries of Examples 1 to 3 was measured according to the procedure described above. The contents of the carbonaceous materials in the intermediate regions for the nonaqueous electrolyte batteries of Examples 1 to 3 were 3.2% by weight, 2.8% by weight, and 3.8% by weight, respectively.

[Discussion]

The result of the charge-and-discharge cycle test shows that each of the nonaqueous electrolyte batteries of Examples 1 to 3 can exhibit a discharge capacity retention ratio higher than that of the nonaqueous electrolyte battery of Comparative Example 1. The result shows that the intermediate region including the carbonaceous material and holding the gel nonaqueous electrolyte portion is provided between the negative electrode including niobium-and-titanium-containing composite oxide and the separator layer, the volume ratio $V_A/V_B$ is set to 5 or more, which can provide an improvement in a cycle life performance.

According to one or more Examples and embodiments described above, a nonaqueous electrolyte battery includes a positive electrode, a negative electrode including a negative electrode active material layer including niobium-and-titanium-containing composite oxide, a separator layer disposed between the positive electrode and the negative electrode, and an intermediate region located between the negative electrode active material layer and the separator layer. This intermediate region includes a carbonaceous material, and hold a gel nonaqueous electrolyte. A volume ratio $V_A/V_B$ is 5 or more. Thereby, this nonaqueous electrolyte battery can exhibit an excellent cycle life performance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A nonaqueous electrolyte battery comprising:
a positive electrode;
a negative electrode comprising a negative electrode active material layer comprising particles of a niobium-and-titanium-containing composite oxide;
a separator layer provided between the positive electrode and the negative electrode, the separator layer comprising insulating particles;
an intermediate region provided between the negative electrode active material layer and the separator layer, the intermediate region comprising a carbonaceous material; and
a gel nonaqueous electrolyte,
wherein at least a part of the gel nonaqueous electrolyte is held in the separator layer and the intermediate region, and
the nonaqueous electrolyte battery satisfies a volume ratio $V_A/V_B$ of 5 or more,
where $V_A$ is a volume of the intermediate region, and
$V_B$ is an average volume of gaps among the particles of the niobium-and-titanium-containing composite oxide in the negative electrode active material layer, and
wherein the negative electrode active material layer comprises a recessed part which faces the separator layer, and the intermediate region is provided in the recessed part.

2. The nonaqueous electrolyte battery according to claim 1, wherein a depth of the recessed part of the negative electrode active material layer is within a range of 5% to 30% of a thickness of the separator layer.

3. The nonaqueous electrolyte battery according to claim 1, wherein a part of the separator layer is in contact with a surface of the negative electrode active material layer.

4. The nonaqueous electrolyte battery according to claim 1, wherein the insulating particles comprise alumina and/or zirconia.

5. The nonaqueous electrolyte battery according to claim 1, wherein the insulating particles comprise particles of a Li-ion-conductive inorganic compound.

6. The nonaqueous electrolyte battery according to claim 5, wherein the particles of the Li-ion-conductive inorganic compound comprise a lithium lanthanum zirconate.

7. The nonaqueous electrolyte battery according to claim 1,
wherein a weight percentage $W_c/(W_c+W_g)$ in the intermediate region is from 0.5% by weight to 10% by weight,
where $W_c$ is a weight of the carbonaceous material in the intermediate region, and
$W_g$ is a weight of the gel nonaqueous electrolyte held in the intermediate region.

8. The nonaqueous electrolyte battery according to claim 1,
wherein the niobium-and-titanium-containing composite oxide comprises a niobium-and-titanium-containing composite oxide having a monoclinic crystal structure and represented by the general formula of $Li_aTiM_bNb_{2\pm\beta}O_{7\pm\sigma}$,
where $0 \leq a \leq 5$, $0 \leq b \leq 0.3$, $0 \leq \beta \leq 0.3$, and $0 \leq \sigma \leq 0.3$, and
M is at least one selected from the group consisting of Fe, V, Mo, and Ta.

9. The nonaqueous electrolyte battery according to claim 1,
wherein the niobium-and-titanium-containing composite oxide comprises titanium-containing composite oxide having an orthorhombic crystal structure and represented by the general formula of $Li_{2+a1}M(I)_{2-b1}Ti_{6-c1}M(II)_{d1}O_{14+\sigma}$,
where $0 \leq a1 \leq 6$, $0 < b1 < 2$, $0 < c1 < 6$, $0 < d1 < 6$, and $-0.5 \leq \sigma 1 \leq 0.5$,
M(I) is at least one selected from the group consisting of Sr, Ba, Ca, Mg, Na, Cs, and K, and
M(II) is Nb or a combination of Nb and at least one selected from the group consisting of Zr, Sn, V, Ta, Mo, W, Fe, Co, Mn, and Al.

10. A battery pack comprising the nonaqueous electrolyte battery according to claim 1.

11. The battery pack according to claim 10, further comprising:
an external power distribution terminal; and
a protective circuit.

12. A battery pack comprising nonaqueous electrolyte batteries each according to claim 1,
wherein the nonaqueous electrolyte batteries are electrically connected in series, in parallel, or in combination of series and parallel.

13. A vehicle comprising the battery pack according to claim 10.

14. The vehicle according to claim 13, wherein the battery pack is configured to recover a regenerative energy of a power of the vehicle.

15. The nonaqueous electrolyte battery according to claim 1, wherein the volume ratio $V_A/V_B$ is 10 or more.

16. The nonaqueous electrolyte battery according to claim 1, wherein the volume ratio $V_A/V_B$ is from 5 to 100.

* * * * *